United States Patent [19]

Owens et al.

[11] 4,078,377

[45] Mar. 14, 1978

[54] INTERNALLY VAPORIZING LOW EMISSION COMBUSTOR

[75] Inventors: Clifton W. Owens, Allen Park, Mich.; Peter Iwu Shen, Redondo Beach, Calif.; Wallace R. Wade, Farmington Hills, Mich.

[73] Assignee: Ford Motor Company, Dearborn, Mich.

[21] Appl. No.: 437,092

[22] Filed: Jan. 28, 1974
(Under 37 CFR 1.47)

[51] Int. Cl.² .......................... F02C 3/08; F02C 7/10; F02C 7/18; F02C 7/22

[52] U.S. Cl. .............................. 60/39.23; 60/39.51 R; 60/39.65; 60/39.66; 60/39.71; 60/DIG. 11; 431/188

[58] Field of Search ................. 60/39.65, 39.71, 39.23, 60/39.74 R, 39.66, 39.72, DIG. 11; 431/166, 172, 187, 188

[56] References Cited

U.S. PATENT DOCUMENTS

| 2,497,321 | 2/1950 | Pattinson et al. | 431/172 |
|---|---|---|---|
| 2,621,477 | 12/1952 | Powter et al. | 60/39.23 |
| 2,684,574 | 7/1954 | Marskell et al. | 60/39.65 |
| 2,698,050 | 12/1954 | Bloomer et al. | 60/39.65 |
| 2,857,204 | 10/1958 | Gross | 60/39.74 R |
| 3,577,878 | 5/1971 | Greenwood et al. | 60/39.65 |
| 3,691,762 | 9/1972 | Ryberg et al. | 60/39.71 |
| 3,724,207 | 4/1973 | Johnson | 60/39.74 R |
| 3,851,466 | 12/1974 | Verdouw | 60/39.65 |
| 3,859,786 | 1/1975 | Azelborn | 60/39.65 |

OTHER PUBLICATIONS

Wade et al., "Low Emission Combustion for Regenerative Gas Turbine," Transactions of ASME, Apr., 1973; pp. 38-48.

Azelborn et al., "Low Emission Combustion for Regenerative Gas Turbine, Part 2," J. of Eng. for Power, Apr., 1973; p. 51.

*Primary Examiner*—Carlton R. Croyle
*Assistant Examiner*—Robert E. Garrett
*Attorney, Agent, or Firm*—Donald J. Harrington; Keith L. Zerschling

[57] ABSTRACT

A combustor adapted for use in a gas turbine engine comprising a combustion prechamber zone, a main combustion chamber zone and a dilution air zone including a system for introducing a premixed fuel-air mixture with elevated inlet air temperatures which allows the thermal efficiency of the engine to be increased without a corresponding increase in the percentage of oxides of nitrogen in the combustion products.

15 Claims, 20 Drawing Figures

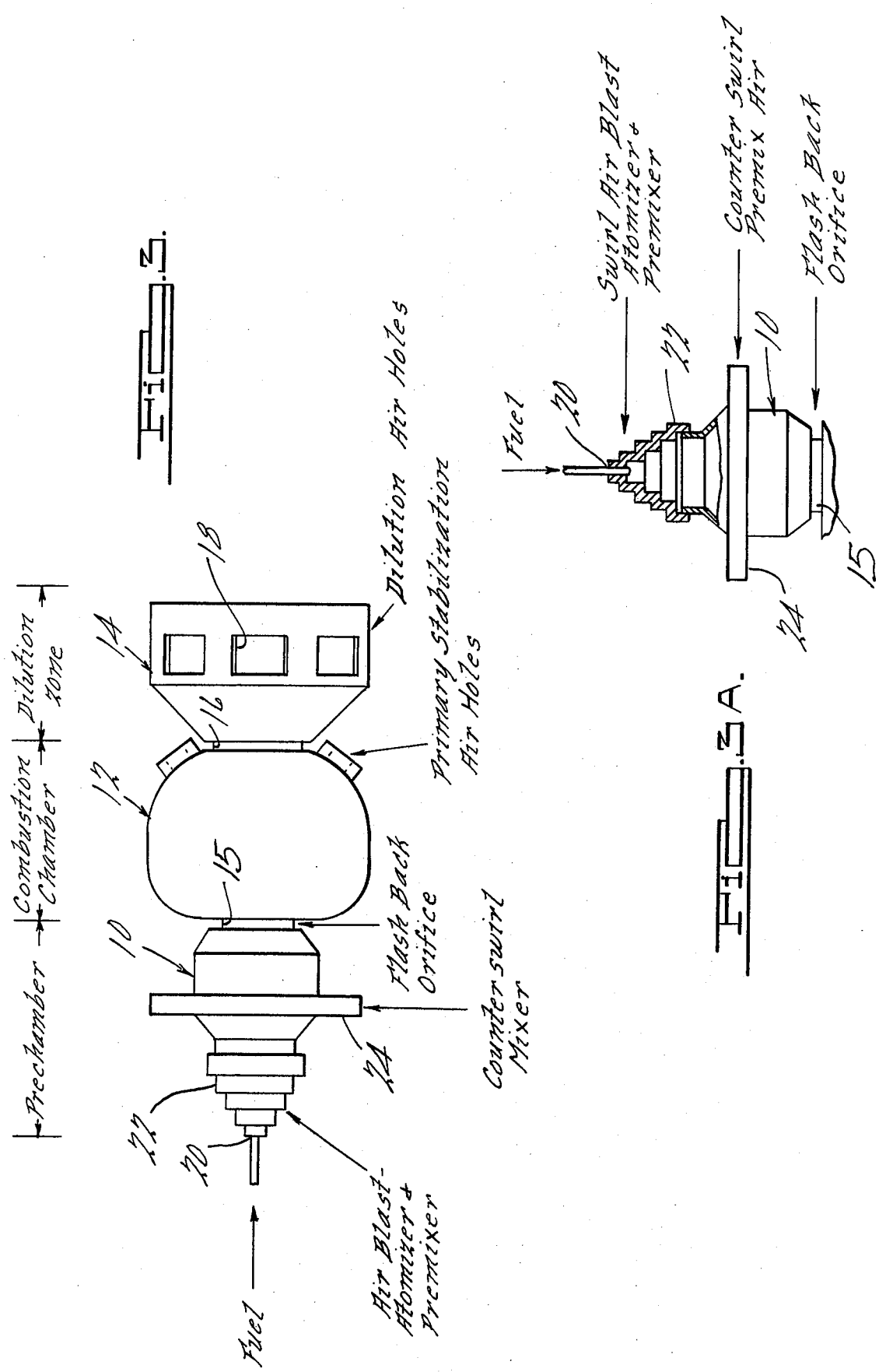

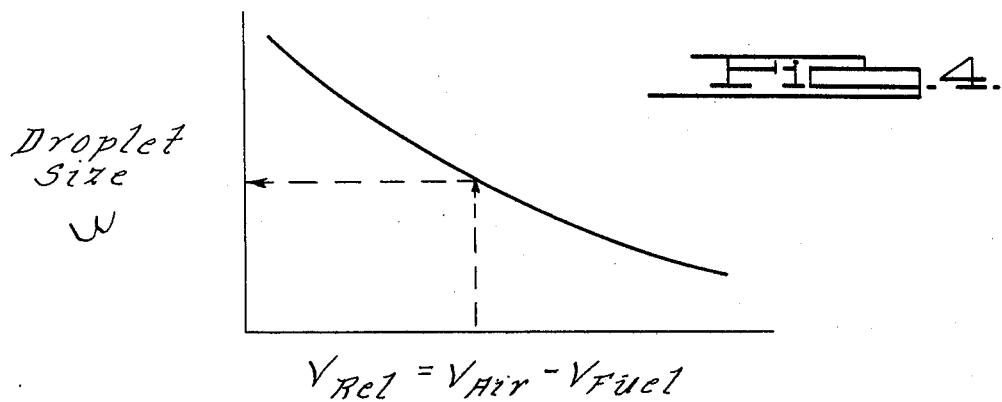
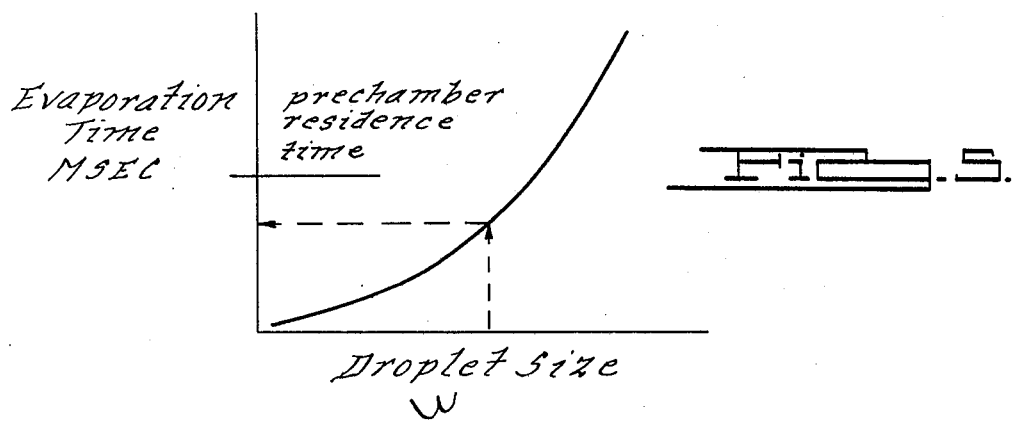
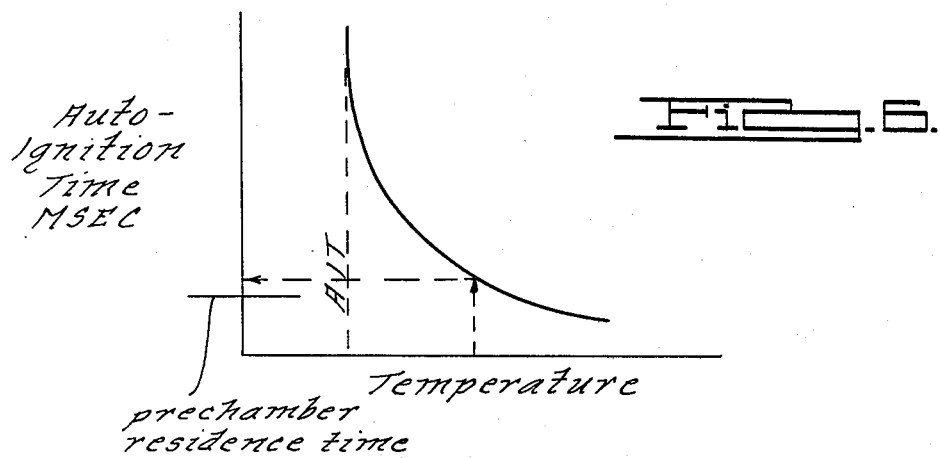
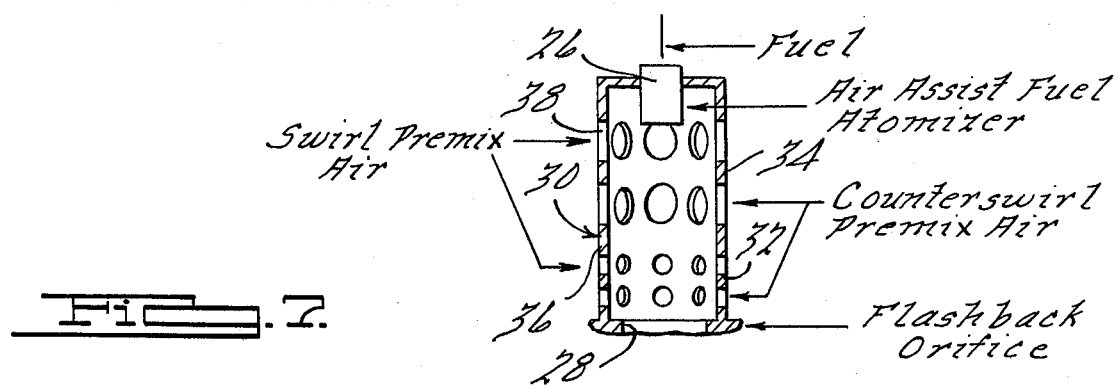

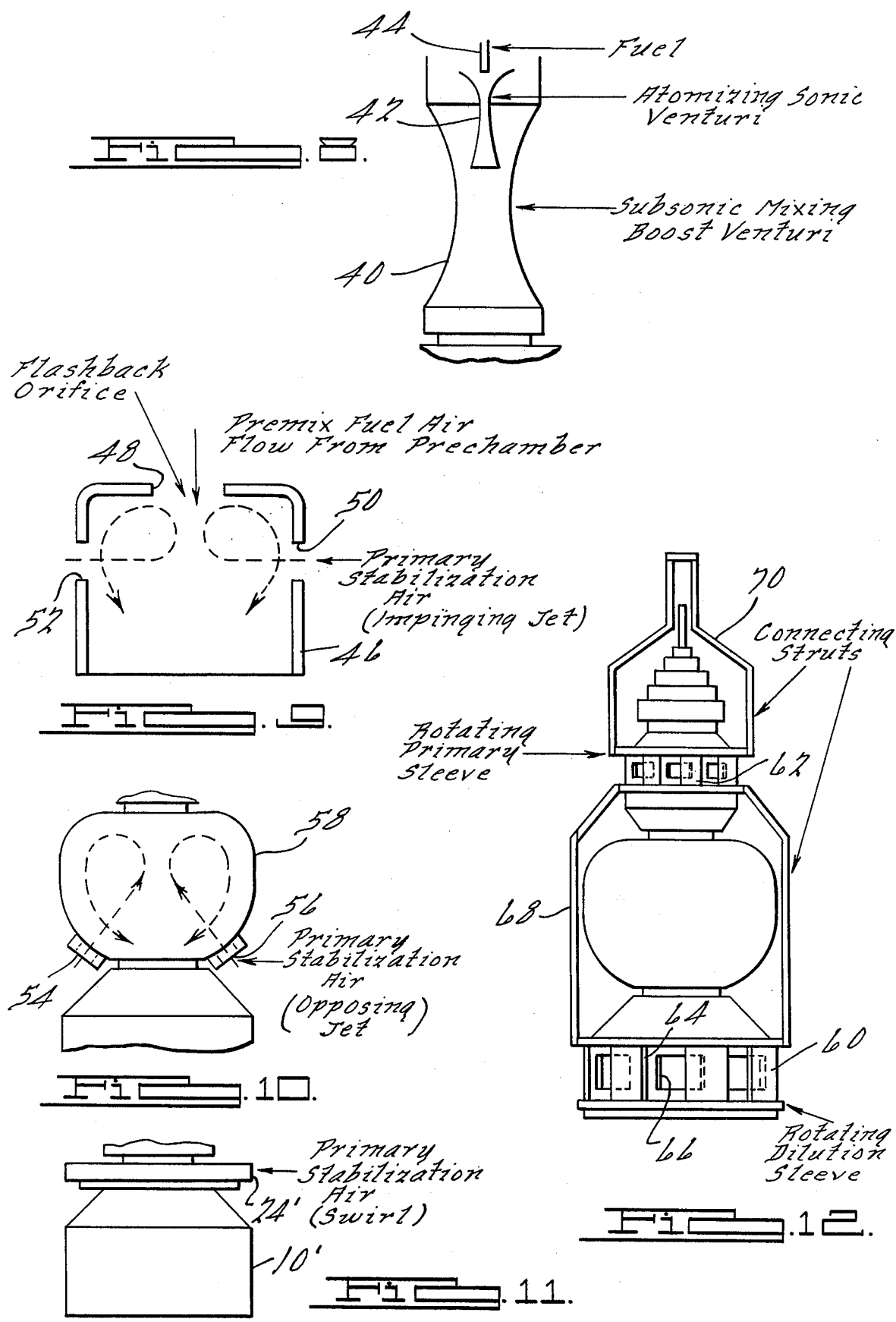

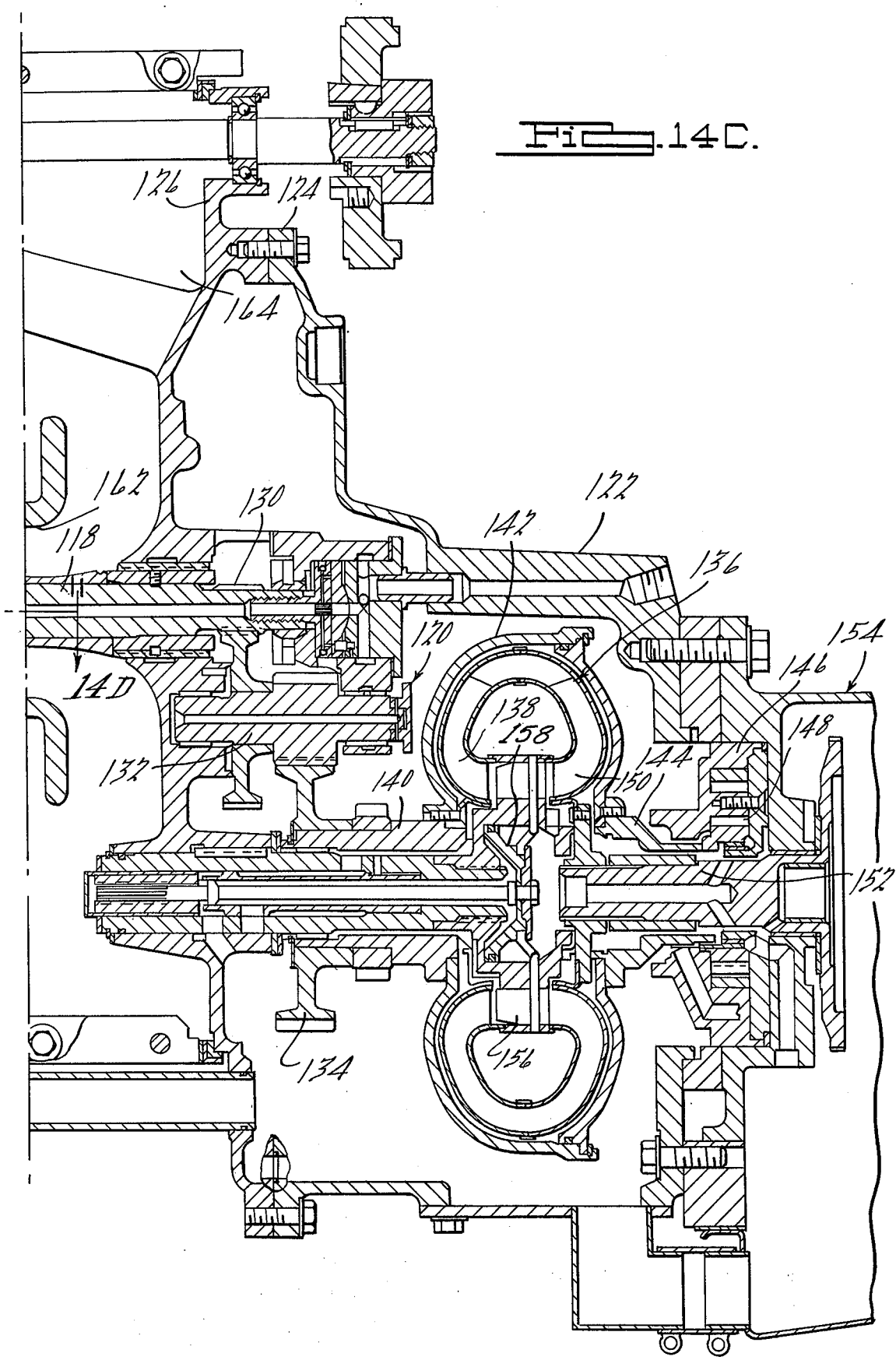

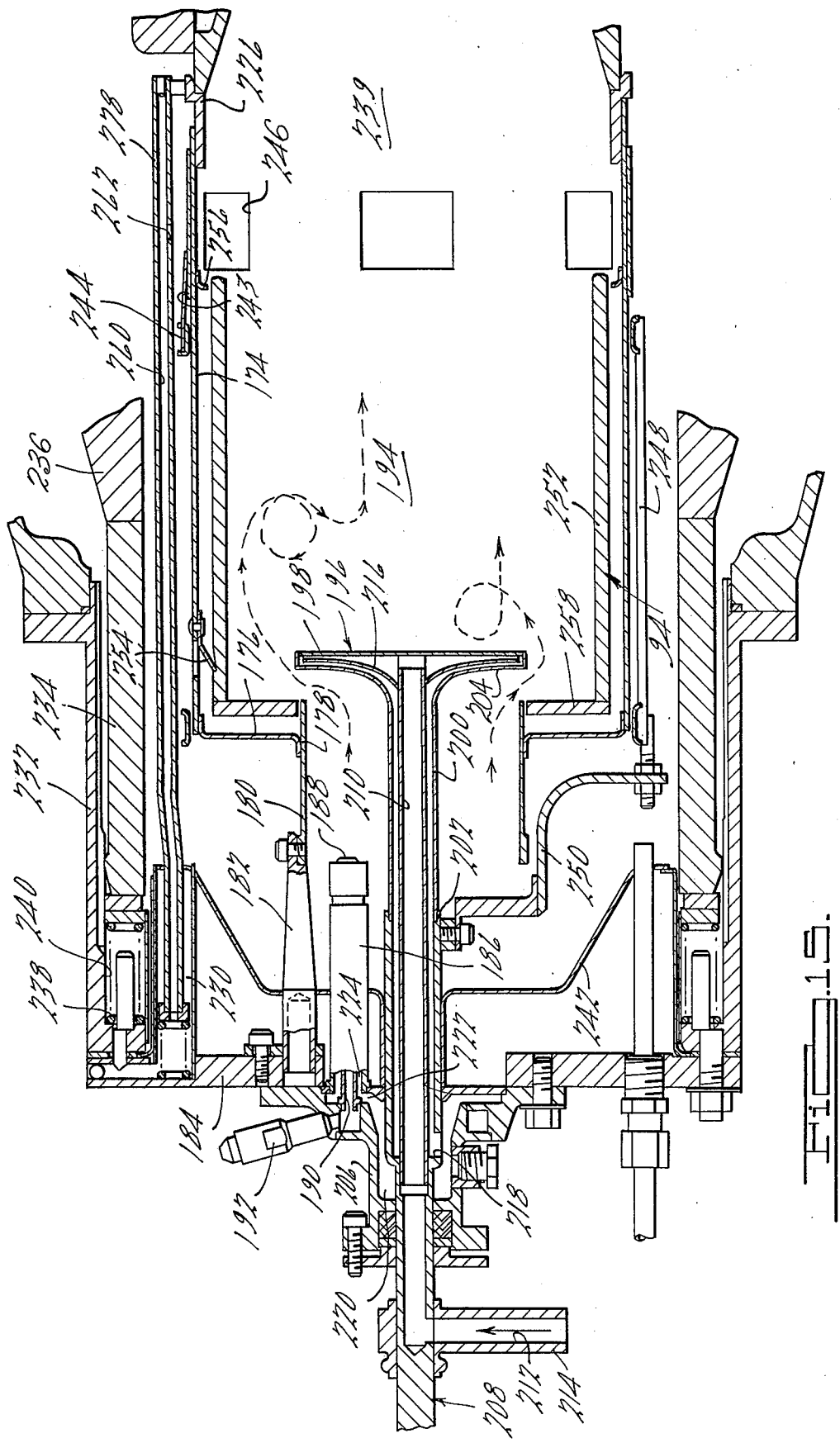

INTERNALLY VAPORIZING LOW EMISSION COMBUSTOR

GENERAL DESCRIPTION OF THE INVENTION

The improved combustor of our invention is adapted for use in a gas turbine engine for powering automotive vehicles.

A continuous combustion power plant system, as distinguished from a spark ignition or compression ignition piston engine, offers a good possibility for meeting stringent exhaust gas emission standards imposed by existing statutes. Currently, catalytic combustion and so-called catalytic reactors are used with internal combustion engines. Continuous thermal combustion in the case of exhaust gas manifold reactors for internal combustion engines have been considered, but a more direct approach is to use a continuous combustion system in a gas turbine engine environment.

The emission products that must be controlled to meet present emission standards are hydrocarbons, carbon monoxide and oxides of nitrogen. Although conventional gas turbine engines may meet the emission levels established for hydrocarbons and carbon monoxide, it has heretofore been difficult to meet the emission regulations for oxides of nitrogen. This is due in part to the fact that a gas turbine engine cycle utilizes high operating temperatures to achieve an acceptable thermal efficiency. If the operating temperatures projected for a gas turbine engine are at or near the maximum temperatures permitted by the existing gas turbine engine materials, including super alloy metals and ceramic materials for high temperature turbine components, and if the gas turbine cycle utilizes a heat regenerator system, the operating efficiency of the engine may approach or surpass the operating efficiency of an internal combustion engine of comparable horsepower, including compression ignition engines and spark ignition engines.

It is an object of this invention to provide a gas turbine cycle having elevated temperatures that will result in improved efficiency without the formation of excessive oxides of nitrogen. The formation rate of oxides of nitrogen is exponentially related to flame temperature, and presence of oxygen concentrations has a secondary effect. If oxides of nitrogen are formed in one stage of the turbine cycle, the concentration cannot be reduced by quenching the temperature to a lower value at a later stage in the gas turbine cycle prior to exhaust of the combustion products to the atmosphere. The decomposition rate of the oxides of nitrogen is too slow for such quenching to have any significance on the effective oxides of nitrogen level.

At any given air-fuel ratio an increase in the oxides of nitrogen occurs in an expotential relationship. At any given inlet temperature, however, leaner air-fuel ratios produce significant reductions in the concentration of oxides of nitrogen. In view of this we have attempted to achieve low concentrations of oxides of nitrogen in emissions while operating at high inlet temperatures by using relatively lean, premixed air-fuel ratios, which provide low flame temperatures. As the flame temperature is decreased upon an increase in the air-fuel ratio, the time required to reach a given nitrogen oxide concentration increases and, conversely, the amount of nitrogen oxides generated in any given time decreases.

If the residence time of a particle of combustible gas mixture in the combustor is known, an estimate may be made of the nitrogen oxide concentration formed in the primary zone of the combustor. This is done by using the relationship of nitrogen oxide formation with respect to time which is discussed in an article entitled "The Oxidation of Nitrogen in Combustion Explosions" by Zeldovich, 80 CTA Physicohimca, USSR, Vol. 21, 1946, Pages 577 to 628. This relationship is illustrated in FIGS. 2 of this specification. The relationship of flame temperatures and the equilibrium NO concentration for varying air fuel ratios is shown in FIG. 1.

Using the relationships of FIGS. 1 and 2, it may be shown that only negligible amounts of nitrogen oxides are formed when the residence time in the primary zone of combustors is 5 miliseconds, the flame temperature is less than 3,000° F and all of the burning occurs at the same air-fuel ratio. It is an object of the invention, therefore, to provide a combustor wherein homogeneous combustion will occur with a uniformly low flame temperature and with a relatively high air-fuel ratio. Notwithstanding the fact that the inlet temperatures are increased by reason of the addition of heat to the inlet air by the recuperator or regenerator, the effective flame temperatures still will be low enough to result in low concentrations of oxides of nitrogen due to the increased air-fuel ratio at which homogeneous burning occurs.

BRIEF DESCRIPTION OF THE FIGURES OF THE DRAWING

FIG. 3 shows in schematic form an internally vaporizing combustor capable of maintaining homogeneous, low temperature, lean air-fuel mixture combustion;

FIG. 3A shows in schematic form one prechamber design for atomizing the liquid fuel upon entering the combustor;

FIG. 4 shows the relationship between droplet size of a particle of liquid fuel to the velocity of fuel particles relative to the velocity of air admitted to the combustion chamber of the combustor;

FIG. 5 shows the relationship between the evaporation time and the droplet size of a particle of fluid in the combustion chamber;

FIG. 6 shows the relationship between the auto ignition time for a particle of fluid admitted to the combustion chamber and the combustion temperature in the combustor;

FIG. 7 is a schematic illustration of another prechamber design intended to establish atomization of the liquid fuel upon entry into the combustor;

FIG. 8 shows schematically another form of combustor prechamber design which includes a sonic atomizing venturi in a subsonic mixing and boost venturi;

FIGS. 9, 10 and 11 show, respectively, three types of air-fuel jet stabilization prechamber designs for a low emission combustor;

FIG. 12 shows in schematic form a variable geometry combustor having a rotating primary valve sleeve and a rotating dilution valve sleeve in the dilution zone of the combustor;

FIGS. 14A, 14B and 14C show in cross-sectional form a power plant assembly comprising a gas turbine engine having the improved combustor of our invention and an automatic transmission for use in an automotive vehicle driveline, the combustor having a center body for achieving a variable flow area in the prechamber relative to the flow area in the dilution zone;

FIG. 15 is a cross-sectional view of an improved combustor for use in the environment shown in FIGS. 14A-14D.

PARTICULAR DESCRIPTION OF THE INVENTION

Figure 1:
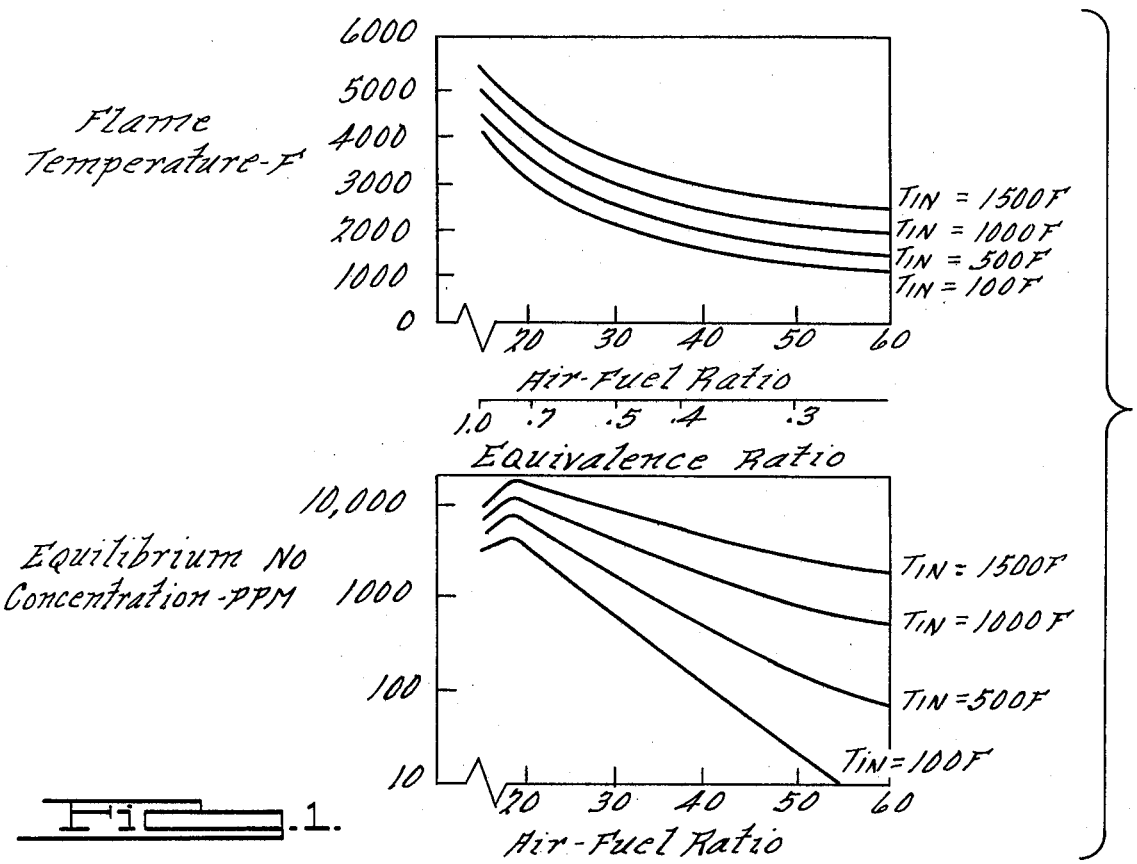
FIG. 1 shows the relationship of combustion flame temperature at equilibrium concentrations of air-fuel mixtures in a combustor adapted for homogeneous, lean, fuel-air mixture burning.
Figure 2:
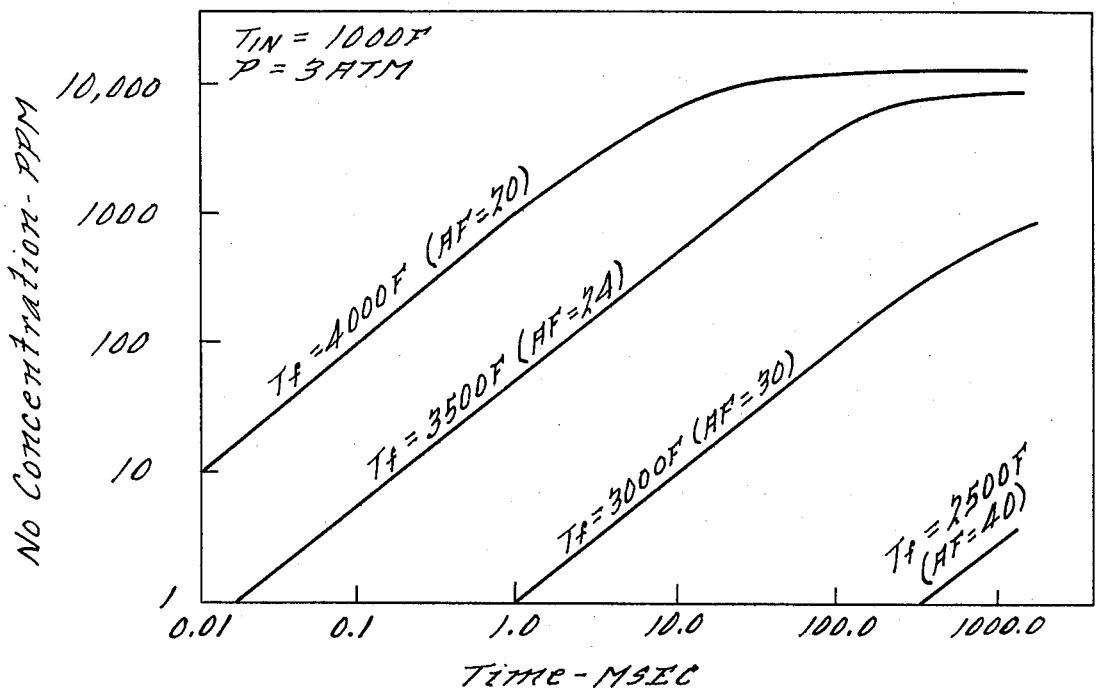
FIG. 2 is a graph showing the relationship of concentration of nitrogen oxides and residence time for a particle of mixed fuel and air in a low emission combustor.

FIGS. 3 and 3A show in schematic form an internally vaporizing combustor which comprises a prechamber 10, a combustion chamber 12 and a dilution zone 14. Prechamber 10 and combustion chamber 12 are connected by a so-called "flashback" orifice or passage 14. Products of the combustion that occurs in the chamber 12 pass through opening 16 into the dilution zone 14. Dilution air is admitted to the dilution zone 14 through dilution air ports 18 located in angularly spaced disposition about the common axis of the prechamber 10, the combustor 12 and the dilution zone 14.

A fuel atomizing nozzle 20 injects fuel into the prechamber 10 and the intake air for vaporizing the fuel is admitted to the prechamber 10 through air intake ports 22. Peripheral ports communicate with air nozzles 24 positioned at peripheral locations about the prechamber 10 to provide a counter-swirling action to the air-fuel mixture in the prechamber thereby increasing vaporization of the combustible mixture before it is passed through the flashback orifice 14. The counterswirl air nozzles provide homogeneous mixing of the fuel and the primary zone combustion air. The fuel droplets are vaporized by the addition of heat to the intake air. This may be done by means of an exhaust gas thermal recuperator, which will be described with reference to the engine shown in FIGS. 14A through 14D.

The air used for atomizing the fuel at the nozzle 20 may be either the primary air used by the prechamber 10 or it may be obtained from an auxiliary air pump or some other air assist. This atomization greatly increases the surface-to-volume ratio of the fuel which in turn increases the rate of heat transfer to the liquid fuel for any given fuel quantity. The vaporization time thus is reduced. If the size of the prechamber is designed to match the vaporization time achieved by the inlet air, the fuel atomizing nozzle and the counterswirl air, the residence time of the particles of liquid fuel may be controlled so that it is larger than the vaporization time to insure complete vaporization. Vaporization time can be controlled by modifying the fuel atomizing characteristics thereby changing the droplet size. Although the residence time should be greater than the vaporization time, it should be shorter than the ignition delay time or auto ignition time at any temperature of the fuel air mixture. The flow patterns in the prechamber can be designed to avoid any recirculation and thus stabilize the flame in the combustion chamber and avoid a flashback or preignition in the prechamber.

The geometry, the size and gas flow characteristics of the combustion chamber must be designed so that the proper recirculatory flow pattern for the fuel-air mixture and the combustion gases is maintained thereby causing continuous ignition of the air-fuel mixture. Ideally, all of the vaporization should occur in the prechamber so that no fuel droplets are present in the combustion chamber. The hot combustor walls for the combustion chamber may also serve to maintain combustion at a stabilized rate. Wall cooling in the combustion chamber should be avoided because quenching the flame can cause excessive, undesirable emissions.

Dilution air is added to the combustion products in the dilution zone thereby adding air to the already lean combustion process and reducing the flame temperature still further without causing instability in the combustion process. This provides a uniform turbine inlet temperature.

FIGS. 4, 5 and 6 illustrate the design parameters that are taken into account in the design of the geometry, size and pressure ratios of the prechamber and the combustion chamber. FIG. 4 shows the relationship between the velocity of the fuel particles with respect to the inlet air velocity and droplet size. The relationship of fuel droplet size to evaporator time is shown in FIG. 5. The prechamber residence time should be greater than the evaporator time indicated in FIG. 5 for any given droplet size. FIG. 6 shows the necessary relationship of auto-ignition time and temperature for any given prechamber residence time. For whatever residence time is indicated, the temperature should be chosen so that the auto-ignition time is higher than the residence time.

FIG. 3A shows a combustor design similar to that indicated in the schematic assembly view of FIG. 3. It is illustrated in FIG. 3A for purposes of comparison with the combustors of FIGS. 7 and 8. The same reference characters are used in FIGS. 1 and 3 to identify corresponding elements.

The design parameters mentioned with respect to FIGS. 4, 5 and 6 are important regardless of the specific combustor prechamber design that is used. Furthermore, the velocity of the intake air must be sufficiently high in the prechamber to avoid flashback into the prechamber. In the FIG. 3A design, the counterswirl air admitted through the nozzles 24 destroys the circulation that is caused by the atomized fuel emitted from the nozzle 20. This provides additional mixing in the prechamber and prevents recirculation of the high temperature combustion gases at the prechamber exit. If hot combustion gas were to be recirculated into the prechamber, it is possible that ignition in the prechamber might occur.

In the FIG. 7 arrangement, the counterswirl air and the swirl air for assisting atomization at the fuel nozzle are admitted through the same orifices. A nozzle is shown at 26 and the flashback orifice is shown at 28. The premix chamber itself, which is shown at 30, comprises a plurality of counterswirl premix air intake ports 32 and 34 and a plurality of companion swirl air inlet ports 36 and 38. These are spaced in alternating fashion as indicated in FIG. 7. Thus the counterswirling air flow produces relatively high fluid shear forces at the interfaces of the swirling air and the counterswirling air. Desirably the angular velocity of the air at the exit flashback orifice is zero or substantially zero so that recirculation of the hot combustion gases is prevented.

In the FIG. 8 embodiment the prechamber comprises a subsonic mixing venturi section 40 and a small venturi section 44 designed for sonic gas flow. The exit of the small venturi 44 is situated at or near the throat of the subsonic venturi section 40. The fuel atomizing nozzle 42 for the prechamber design of FIG. 8 is located at the entrance for the small venturi 44. The subsonic venturi increases the pressure differential across the small venturi thereby producing sonic velocity at the throat, and atomization of the fuel admitted at the nozzle 42 is more complete because of the larger velocity gradients in the sonic venturi.

FIGS. 9, 10 and 11 show various combustion chambers or primary zone designs. The design of FIG. 9 shows a substantially cylindrical housing 46, the closed end of which is formed with flashback orifice 48.

The peripheral wall of the housing 46 is formed with primary stabilization air inlet ports 50 and 52. These are located in juxtaposition so that the stabilization air admitted through each port causes infringement of the two air flow streams so that the primary air assumes the flow pattern indicated by the dotted lines shown in FIG. 9. The respective jets admitted through each port recirculate before they move forward toward the dilution zone. The recirculating flow pattern is considered necessary in the primary zone design so that continuous ignition of the fuel-air mixture supplied by the prechamber will be maintained.

Stabilization is achieved by carefully calibrating the size of the primary zone and the location of the jets since it is not possible in a continuous combustion design to achieve stabilization by varying the density of droplets which is the conventional practice with a conventional combustor design.

The additional air admitted through the primary air flow ports in the combustor chamber, in addition to assisting the stabilization of the combustion process, results in leaner mixtures than the mixtures that occur in the prechamber. In this way locally rich fuel-air mixture regions in the combustion chamber are prevented. The momentum of the impinging primary flow jets and the momentum of the premixed fuel-air mixture flow at the flashback orifice also must be considered in designing the combustion chamber for combustion stabilization.

In the design shown in FIG. 10, primary stabilization again is introduced into the combustion chamber through ports located downstream from the flashback orifice. These ports are shown at 54 and 56. The combustion chamber housing in the FIG. 10 design is shown in a generally spherical configuration as indicated at 58. The direction of entry of flow through the ports 54 and 56 is such that the flow velocity has a substantial reverse velocity component. The jets combine in a region substantially in the center of the generally spherical housing 10, and the flow established by the air entering the ports 54 and 56 circulates from the center toward the rear cylindrical surface of the housing as indicated generally by the dotted lines in FIG. 10. The flow area at the exit of the primary zone is relatively restricted compared to the design shown in FIG. 9. It provides additional intensity for the recirculating flow patterns.

The combustion chamber design shown in FIG. 11 is similar to the one shown in FIG. 6 insofar as it is designed to achieve swirl stabilization. Primary stabilization air, however, is admitted to the combustion chamber at a location relatively close to the nozzle thereby creating a recirculation pattern within the core of the vortex.

In FIG. 12 we have shown a so-called variable geometry combustor. It is essentially the same as the one described with reference to FIG. 3, although it includes variable prechamber air flow ports and variable dilution zone air flow ports which are controlled by air flow control valves. In the particular embodiment shown in FIG. 12, the valves are in the form of rotary valve sleeves. The valve sleeve for the dilution zone is shown at 60. A corresponding rotary valve sleeve for the prechamber is shown at 62. The valve 60 comprises spaced valve openings 64 which register with the dilution air flow ports 66 in the dilution zone. As the sleeve 60 is rotated, the effective flow area of the ports 66 is changed as the degree of registry of the ports 66 with the openings 64 is varied. Sleeve 62 for the prechamber also is formed with peripherally spaced openings which register with ports for the prechamber air flow. The sleeves 62 and 60 are connected together for rotation in unison by rigid connecting struts 68. Motion is imparted to the sleeves 62 and 60 by adjusting struts 70. As the openings in the prechamber are opened, the openings in the dilution zone are closed, and vice versa.

Figure 12A:
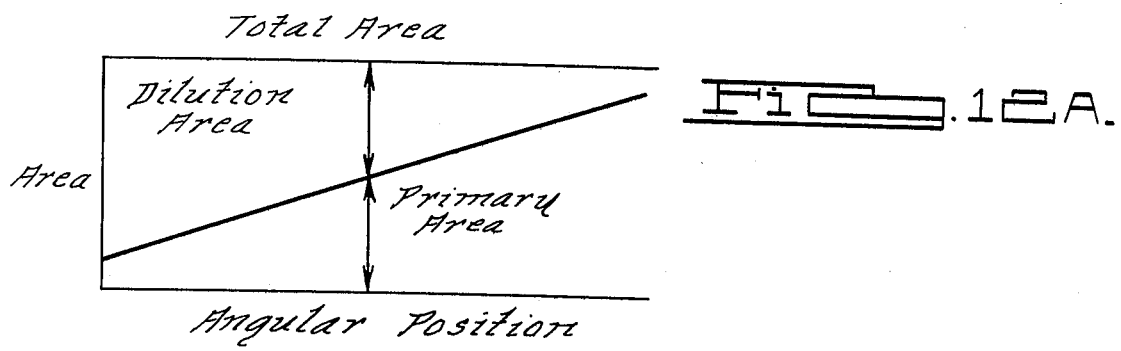
FIG. 12A shows the relationship of dilution valve area to primary valve area for each angular position for the rotary primary dilution valve sleeve.

In a gas turbine engine the fuel flow range is about 10:1, whereas the air flow is about 3:1. Because of this the effective air-fuel ratio range is at least 3:1. Unless some adjustment is made to compensate for these variations, the primary zone air-fuel ratio will vary over a range of 3:1. Consequently the flame temperature experienced in the combustion chamber will vary within wide limits. When the temperature is near the low temperature limit, the resulting flame temperature might be below the lean flammability limit for the air-fuel mixture. On the other hand, when the temperature is near the upper temperature limit, high temperatures might result in excessively high oxides of nitrogen formation rates. Either condition is undesirable. The embodiment of FIG. 12 tends to overcome this possible shortcoming by reason of its variable geometry characteristic. It functions to maintain a constant flame temperature through the operating range. It is effective, furthermore, to provide a relatively constant combustor pressure drop over the operating range of the engine. Both of these objectives are achieved by the variable flow areas provided by the prechamber valve and the dilution zone valve. Total air flow area for the combustor is unchanged as air passes through the combustion cycle. Because of the area relationships indicated in FIG. 12A, the dilution flow decreases upon an increase in the primary area as the angular position of the common valves change. The total area is represented in FIG. 12A by a horizontal line which is equal at all times to the sum of the primary area and the dilution area.

The control system for adjusting the position of the valves may be made sensitive to a primary zone flame temperature signal. The magnitude of that signal may be compared to a preset value for the flame temperature in the primary zone, and the amount of the valve adjustment may be made proportional to the so-called temperature error.

Figure 13:
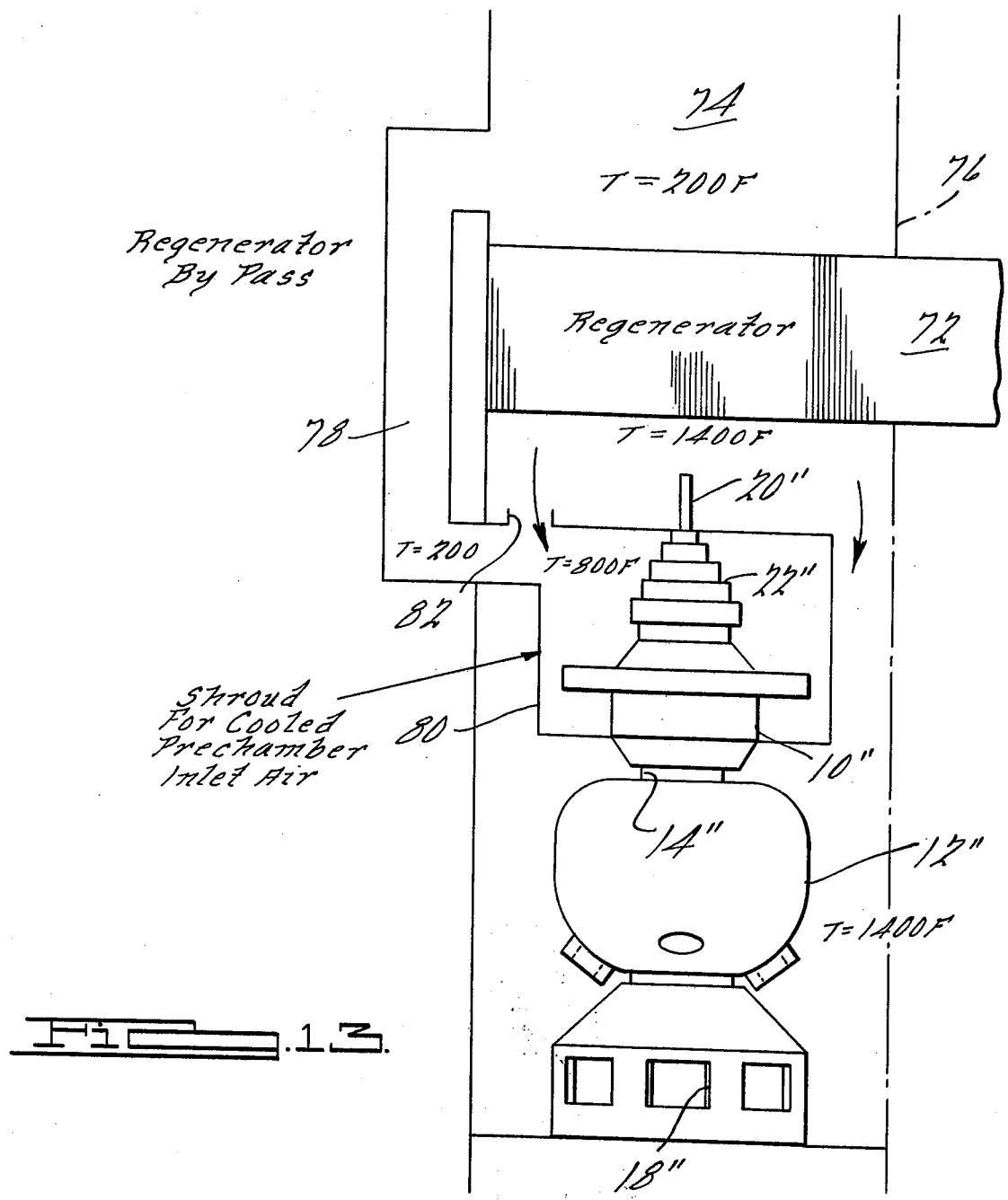
FIG. 13 shows in schematic form a combustor similar to that shown in FIG. 12, but it includes a regenerator bypass for reducing the tendency for preignition in the combustor prechamber.

We have shown in FIG. 6 the relationship of autoignition time to temperature. Evaporation time however is independent of temperature if the temperature is higher than the so-called end point temperature of the fuel. If the engine uses a regenerator capable of recovering a high percentage of the exhaust heat, it may be possible to prevent preignition in the prechamber by bypassing air around the regenerator and mixing that air with some of the prechamber air to reduce the effective prechamber air temperature and to increase the ignition delay time. This modification is illustrated in FIG. 13 where we have shown a combustor substantially the same as the combustor which is shown in FIG. 3 although it is shown in a combination with a regenerator, the latter being indicated by reference character 72. The other elements of the FIG. 13 construction that are common to the FIG. 3 construction are identified by the same reference numerals although double prime notations are added.

The compressor discharged air passes through air flow region 74 in the FIG. 13 embodiment and enters the regenerator core. The regenerator core rotates about axis 76. The air that passes through the regenerator core is heated to a temperature of approximately 1400°. The compressor discharge temperature at the inlet side of the regenerator core may be about 200° F.

A bypass flow passage 78 extends from air flow region 74 to a shroud 80, which surrounds the prechamber. The heated air passing through the regenerator is mixed with the unregenerated air in the interior shroud 80 as the heated air passes through mixing port 82. The average temperature in the prechamber then is reduced, and the amount of that reduction can be controlled by suitably controlling the amount of the bypass air thereby maintaining a constant prechamber temperature for the purpose of achieving the desired auto-ignition time and vaporization time.

A working embodiment of the invention is shown in FIG. 15 and its operating environment is shown in FIGS. 14A through 14D. This embodiment includes a so-called center body stabilization feature. The flow area of the orifice connecting the prechamber and the combustion chamber is varied. The construction of FIG. 7 includes a combustion chamber housing 84 having an end wall 86 in which is formed a flow passage for orifice 88 for connecting the interior of the combustion chamber 84 with the interior of the prechamber.

A center body, which in the illustration of FIG. 15 is generally conical in form, is situated in registry with an inlet orifice. The center body, which is identified at 196, comprises a three-dimensional surface of revolution which directs the air-fuel mixture flow toward the outer walls of the combustion chamber as the prechamber gases enter the combustion chamber thereby creating a recirculating flow pattern indicated by means of dotted lines in FIG. 15. Flashback or uncontrolled burning in the prechamber is prevented because of the generation of a high fuel-air mixture velocity through the annular gap between the center body and the margin of the inlet orifice. In this embodiment flashback control and air flow control can be achieved by the same mechanism; namely, the center body. Separate openings corresponding to the prechamber air flow passages in the FIG. 12 embodiment are not required. The design and maintenance problems associated with hot metal valve sleeves then are eliminated. It is also possible to eliminate the primary stabilization air openings, such as those shown in FIG. 10. The total primary zone air then passes through the prechamber and is fully mixed with the atomized fuel prior to entering the combustion chamber. The primary zone air-fuel ratio is determined by the temperature rise that is required to raise the temperature from the combustor inlet temperature to the desired flame temperature. We have found that a flame temperature of approximately 3000° F will produce reduced emissions of oxides of nitrogen, carbon monoxide and unburned hydrocarbons.

As indicated in FIG. 15, the air flow patterns are of two kinds for establishing flame stabilization. The center body deflects the air-fuel mixture flow to the wall of the combustor thereby establishing reverse flow stabilization. The inwardly flowing combustion products ignite the outwardly flowing air-fuel mixture. Any recirculation flow pattern that is established on the downstream side of the center body will provide added stabilization.

Figure 14A:
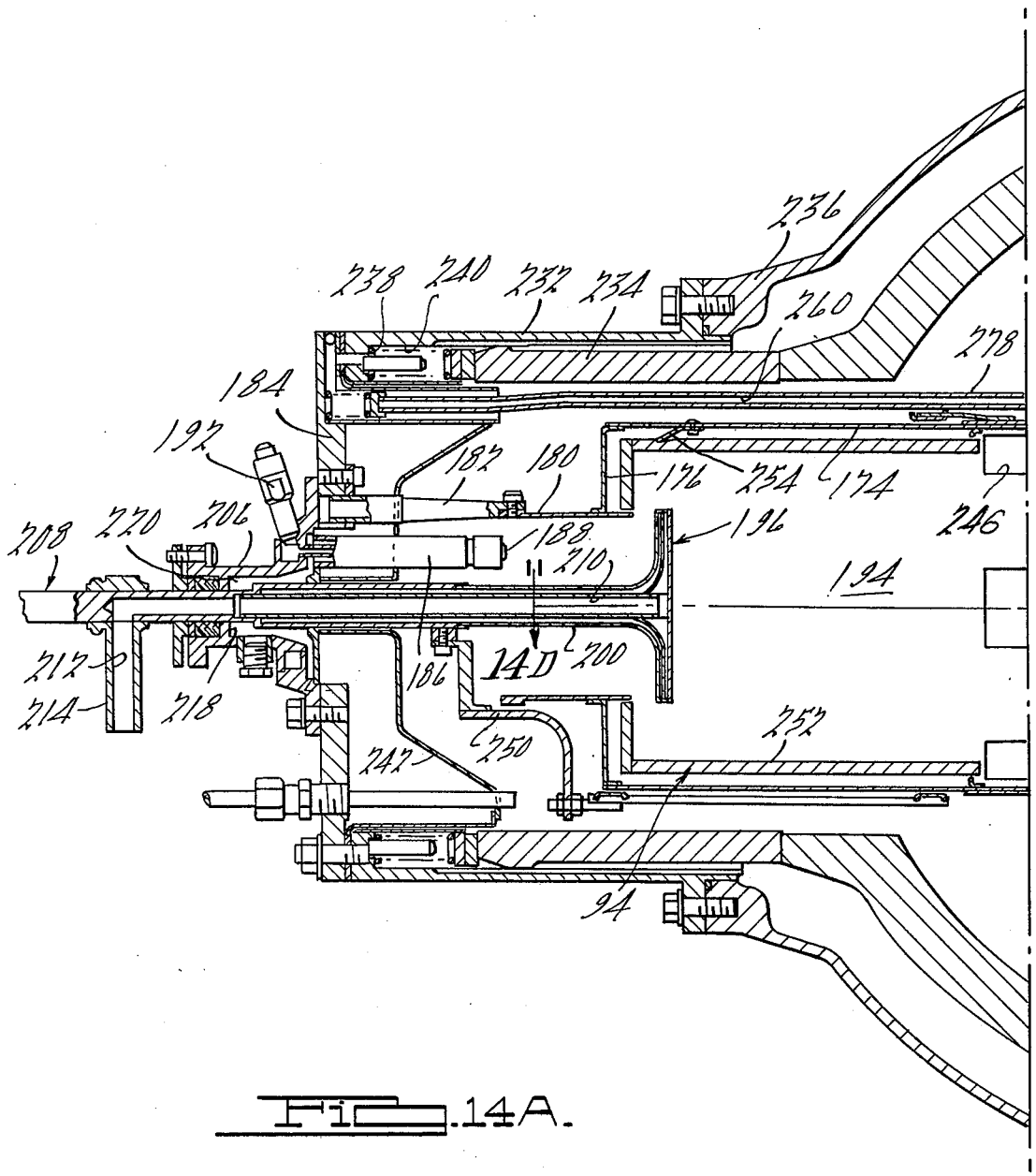
Figure 14B:
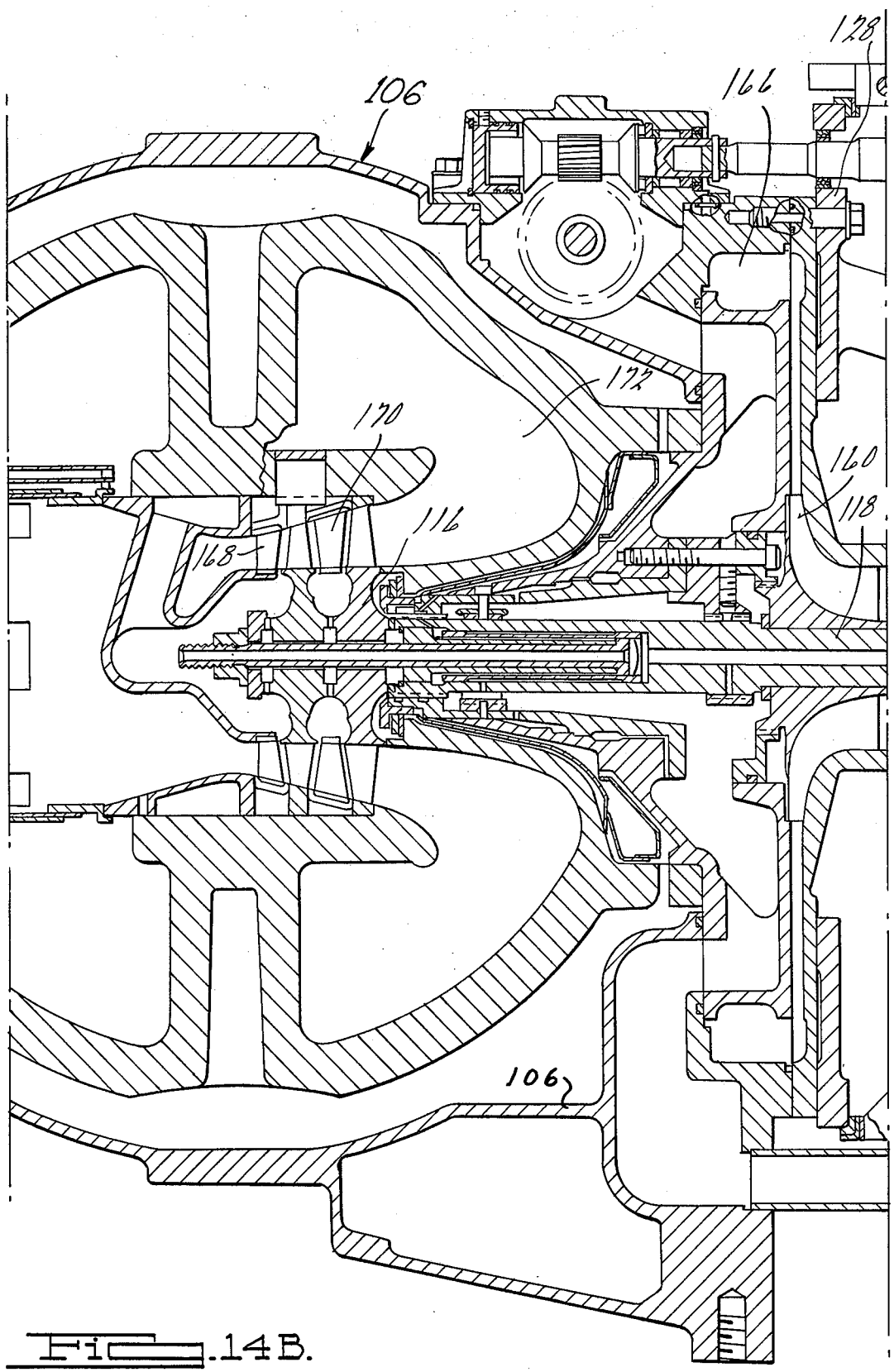
Figure 14D:
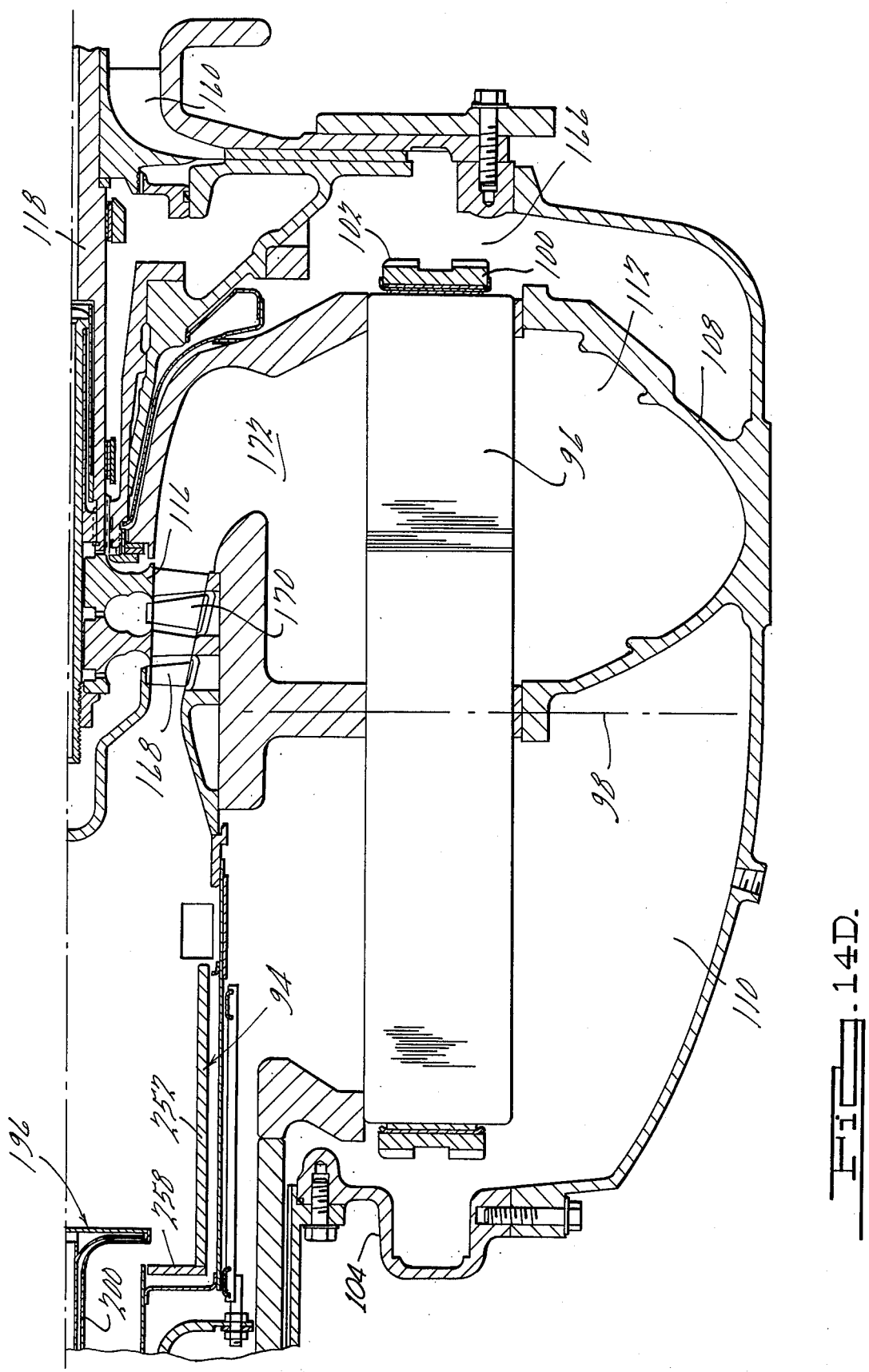
FIG. 14D is a cross-sectional view taken along the section line 14D—14D of FIGS. 14A, 14B and 14C.

The combustor of FIG. 15 is shown generally by reference character 94. The gas turbine engine with which the combustor of the invention is used is a regenerated engine and the regenerator core is indicated in FIG. 14D by reference character 96. The regenerator core is preferably a ceramic matrix core having axial flow passages. It is generally cylindrical in shape and adapted to rotate about its geometric axis 98. Surrounding the cylindrical ceramic matrix 96 is a rim 100, which carries a ring gear 102. It in turn is driven by a drive pinion. The regenerator core is located in a regenerator core housing portion 104 of the gas turbine engine housing, the latter being indicated generally in FIG. 14B by reference 106. The housing 104 is closed by a regenerator cover 108 which cooperates with the housing portion 104 to define a compressor discharge air chamber 110 and an exhaust gas regenerator outlet flow chamber 112.

The turbine rotors for the gas turbine engine are shown at 116. They are connected drivably to driveshaft 118, which serves as a power output shaft for the engine and as a power input shaft for a torque converter transmission mechanism identified generally by reference character 120. Transmission 120 is located in transmission housing 122, which is bolted at its outer periphery 124 to turbine compressor housing 126, the latter being bolted at its margin 128 to the engine housing 106.

The driveshaft drive pinion 130 is connected to countershaft gearing 132 at the transmission 120. Gearing 132 meshes with impeller drive gear 134 which is coupled drivably to impeller 138 of the hydrokinetic torque converter 136. An impeller drive sleeve shaft 140 is connected to one of its ends to the gear 134 and at its other end to the impeller drive shell 142, the latter being supported by sleeve 144 which is journalled in a bearing outlet formed in pump housing 146. This housing 146 forms a part of a positive displacement pump 148, which serves as a pressure source for the transmission.

Torque converter impeller 150, which is located in fluid flow relationship with respect to the impeller 138, is connected drivably to torque converter output shaft 152. This in turn is connected to the power input gear for a multi-ratio power transmission mechanism indicated generally by reference character 154. The output gear for the transmission mechanism 154 can be connected to a driveshaft of an automotive vehicle driveline.

An adjustable stator 156 is located between the entrance section of the impeller 138 and the flow exit section of the turbine 150. The angularity of the blades of the stator 156 can be adjusted by a pressure operated servo piston 158, which is connected to a plurality of blade adjusting mounting shafts for the individual blades of the stator 150.

Turbine driven shaft 118 is connected drivably to centrifugal compressor blades 160 for the turbine engine. The compressor includes inducer blade portions 162 which communicate with a compressor air intake flow passage 164 formed in the compressor housing 126. The radial discharge portion of the compressor blades 160 communicates with air flow diffuser chamber 166, which receives the compressor air flow and reduces its velocity thereby causing a pressure build-up to a value of approximately 4 atmospheres. This is accompanied by a temperature rise to a temperature of about 350° F. The heat in the chamber 166 communicates with the previously described compressor air chamber 110 formed by the regenerator cover. The air passes through the regenerator core 96 and enters the combustor 94. The exhaust gases from the combustor 94 enter the turbine blade nozzle section 168 and then the primary turbine of the power turbine section 116. Intermediate nozzle section 170 is disposed between the two power turbine nozzle sections. The exhaust gases from the power turbine enter region 172 and then pass outwardly through the regenerator core 96 where a heat transfer takes place. The temperature that exists in the chamber 172 may be about 1700° F, but the exhaust gas temperature drops to a value of about 500° when it is received in chamber 112. The thermal energy represented by this temperature drop is recovered by the air passing from chamber 110 to the combustor 94. The temperature is then increased from a value of about 350° to a value of about 1600° F before entry into the combustor. The effective combustion temperature in the combustion chamber of the combustor may be about 3000°, as mentioned previously.

The combustor 94 shown in the cross-sectional assembly view of FIG. 14 is shown in detail in FIG. 15. Combustor 94 includes a cylindrical housing 174, which has a closed end wall 176 with a central opening 178. A cylindrical prechamber housing 180 is received within the opening 178 and forms a rigid connection with the wall 176. The left-hand margin of the cylindrical housing 178, as viewed in FIG. 15, is connected to a plurality of stationary support arms 182 which are secured in cantilever fashion to the gas turbine engine housing portion 184. A fuel atomizing nozzle 186 supported by the housing portion 184 extends in a generally axial direction as indicated in FIG. 15. The discharge end 188 of the nozzle 186 is located at the gas flow entrance section of the housing 180.

Nozzle 186 includes an internal fuel passage 190 which communicates with a suitable fuel conduit as shown at 192. The right-hand end of the prechamber housing 180 is open and it communicates with the interior 194 of the primary combustion chamber defined by the housing 174.

A so-called center body 196 is stationed adjacent the open end of the prechamber housing 180. It comprises a heat resisting surface 198 which forms a portion of the interior wall of the primary combustion chamber 194. A cylindrical center body stem 200 is connected at its left-hand end to support sleeve 202. Its right-hand end is radially divergent and is connected at its outer margin 204 to the outer margin of the center body wall 198.

A suitable nozzle air and nozzle fuel flow adaptor 206 is carried by the engine housing portion 184. The support sleeve 202 is slidably positioned in the adaptor 206. A suitable center body control lever mechanism is shown generally at 208 and is adapted to move the support sleeve 202 in either axial direction.

An air conducit 210 extends concentrically through the stem 200. It is connected to the sleeve 202 at its left-hand end to establish communication with an air passage 212 formed in an air passage adaptor 214. Air from a suitable air assist pump or some other suitable source of air pressure is delivered to the passage 212. That air is used for the purpose of cooling the center body. It passes through the passage 210 and is directed radially outwardly across the outer side of the center body 196. For this purpose an internal baffle 216 is disposed between a flanged end of the stem 200 and the radial surface 198.

The cooling air passing through the passage 210, after it passes radially outwardly, is conducted radially inwardly between the annular space provided by the flanged end of the stem 200 and the baffle 216. The air then passes in a left-hand direction, as viewed in FIG. 15, through the annular passage defined by the concentric stem 200 and the passage 210. As it passes through air port 218 in the support sleeve 202, it enters the pumping chamber 220 formed in the adaptor 206. The air that is returned from the center body may be heated to a temperature of approximately 300° to 500° F. That heated air then passes through air ports 222 and into an annular air flow passage 224 defined by the concentric fuel passage 190 and the cylindrical housing for the nozzle 186. There are three such nozzles provided in the assembly although only one of them is shown at FIG. 15.

The heated air passing through the nozzle causes an increase in the temperature of the fuel flowing through the fuel passage 190. It also assists in atomizing the fuel as it leaves the exit 188 of the nozzle. Both heated air and fuel are discharged through the nozzle openings at the entrance of the prechamber.

The right-hand end of the primary combustion chamber housing 174 carries a support ring 226. The support ring 226 is carried by support rods, one of which is identified in FIG. 15 by reference numeral 228. These rods are rigid cantilever supports which are secured at the left-hand ends, as viewed in FIG. 15, to a support sleeve 230 which is carried by the housing portion 184. Another housing portion 232 of the engine housing receives a ceramic liner of generally cylindrical shape as shown at 234. The wall portion 184 is secured to the left-hand end of the housing portion 232. Cylindrical ceramic liner 234 is arranged in abutting disposition with respect to a second ceramic liner portion 236. The portions of the ceramic liners are spring loaded into engagement, one with respect to the other, by springs 238 received within spring pockets 240 formed in the housing portion 232.

A metal shroud 242 is located at the left-hand side of the prechamber 180 as shown in FIG. 15. It extends from the support sleeve 202 to the outermost margin of the housing position 232 and serves to guide the regenerator output air flow into the entrance section of the prechamber housing.

Reference character 244 designates generally the location of the dilution zone. It is downstream from the primary combustion chamber 194. The dilution zone and the primary combustion chamber in the particular embodiment shown in FIG. 15 has a common housing.

A plurality of openings or dilution zone ports 246 is formed in the dilution zone housing. A sliding valve plate 248 registers with the openings 250. A similar valve plate is supplied for each of the other openings. When the valve plate 248 is moved in a right-hand direction, as viewed in FIG. 15, the effective area of the openings 246 decreases. It increases, however, upon movement of the plate 248 in the opposite direction.

Movement of the plate 248 and the companion plates for the other valve openings is accomplished by an actuator ring 252 which surrounds the housing 174. A spring bar connection is provided between the ring 252 and each of the valve plates 248. The ring 252 is connected to actuator rod 254. The rod 254 is connected to connector 256 which is joined to the support sleeve 202 of the center body. The connector 256 moves in unison with the center body thereby causing the valve plates 258 to shift with respect to their valve openings. An increase in the effective area at the exit of the prechamber zone is accompanied by a decrease in the effective area at the dilution zone, and vice versa.

The interior of the housing 174 is protected by cylindrical ceramic cylinder 258 which may be silicon nitride or carbide. It is held in fixed disposition with respect to the housing 174 by suitable connectors 260 and 262. A ceramic disc 264 protects the housing end wall 176.

The support rods 228 are provided with internal air passages 260 which receive air from the air assist pump and distribute it through port 262 directly adjacent the valve plates 242 for the purpose of cooling them.

Having thus described preferred embodiments of our invention, what we claim and desire to secure by U.S. Letters Patent is:

1. An internally vaporizing combustor for use in generating high velocity fuel combustion exhaust gases comprising a combustor prechamber and a primary combustion chamber, said prechamber and combustion chamber being in communication through an opening, one with respect to the other, the prechamber being upstream from the combustion chamber, said combustor being adapted to be disposed on the discharge side of an air compressor whereby prechamber air flow is admitted to an entrance zone of said prechamber, a liquid fuel nozzle means located in said prechamber for establishing an atomized liquid fuel flow for supporting combustion, a dilution zone located on the downstream side of said primary combustion chamber, dilution zone air flow ports in said combustor housing for establishing a flow path between the flow outlet side of said air compressor and the interior of said dilution zone, means for controlling the rate of air flow through said prechamber and for establishing a recirculating flow pattern of the air-fuel mixture contents of said prechamber port entering said combustion chamber whereby combustion in said combustion chamber is stabilized, the evaporator time of the liquid fuel in said prechamber being less than the residence time in said prechamber and the auto ignition time of the air-fuel mixture entering said primary combustion chamber being greater than the prechamber residence time for any given operating temperature of the air-fuel mixture and means for varying the size of said opening and for controlling the dilution air flow in predetermined relationship to the control of air flow through said prechamber whereby the pressure drop across the combustor is substantially uniform.

2. An internally vaporizing combustor for use in generating high velocity fuel combustion exhaust gases comprising a combustor prechamber and a primary combustion chamber, said prechamber and combustion chamber being in communication through an opening, one with respect to the other, the prechamber being upstream from the combustion chamber, said combustor being adapted to be disposed on the discharge side of an air compressor whereby prechamber air flow is admitted to an entrance zone of said prechamber, a liquid fuel nozzle means located in said prechamber for establishing an atomized liquid fuel flow for supporting combustion, a dilution zone located on the downstream side of said primary combustion chamber, dilution zone air flow ports in said combustor housing for establishing a flow path between the flow outlet side of said air compressor and the interior of said dilution zone, means for varying the size of said opening and thereby controlling the rate of air flow through said prechamber and for establishing a recirculating flow pattern of the air-fuel mixture contents of said prechamber port entering said combustion chamber whereby combustion in said combustion chamber is stabilized, the evaporator time of the liquid fuel in said prechamber being less than the residence time in said prechamber and the auto ignition time of the air-fuel mixture entering said primary combustion chamber being greater than the prechamber residence time for any given operating temperature of the air-fuel mixture, valve means for varying the effective flow area of said dilution zone air intake openings, and means for varying the degree of communication between said prechamber and said primary combustion chamber, said last-named means being adapted to operate in unison with the aforesaid valve means whereby an increase in the degree of communication between said prechamber and said primary combustion chamber is accompanied by a corresponding decrease in effective flow area of said dilution zone air flow openings whereby the effective combustor pressure drop for the gases passing through the combustor may be controlled at a relatively constant value throughout the operating range of the combustor.

3. The combination as set forth in claim 2 wherein said means for controlling the degree of communication between the prechamber outlet and the primary combustion chamber inlet is a center body adapted to register with the exit opening of said prechamber, said center body comprising a wall movable toward and away from the margin of the opening between the prechamber and the combustion chamber thereby providing a variable annular area through which the prechamber exit flow is controlled, an increase in the effective annular area being accompanied by a corresponding decrease in the effective flow area for said dilution zone air flow ports.

4. The combination as set forth in claim 3 wherein said center body comprises a stem extending generally axially with respect to the axis of said prechamber, the end of said center body adjacent said primary combustion zone being adapted to deflect the combustible air-fuel mixture in a generally radial direction toward the outer wall of said primary combustion chamber thereby establishing a recirculating flow pattern in the interior of said combustion chamber.

5. The combination as set forth in claim 2 wherein said means for controlling the degree of communication between the prechamber outlet and the primary combustion chamber inlet is a center body adapted to register with the exit opening of said prechamber, said center body comprising a wall movable toward and away from the margin of the opening between the prechamber and the combustion chamber thereby providing a variable annular area through which the prechamber exit flow is controlled, an increase in the effective annular area being accompanied by a corresponding decrease in the effective flow area for said dilution zone air flow ports, said center body having formed therein a central air flow passage, means for directing auxiliary air to said center body air flow passage thereby cooling the surfaces of said center body that are exposed to combustion gases, and means for circulating said center body air flow through said nozzle thereby assisting in atomization of the liquid fuel admitted to said prechamber through said nozzles.

6. The combination as set forth in claim 3 wherein said center body comprises a stem extending generally axially with respect to the axis of said prechamber, the end of said center body adjacent said primary combustion zone being adapted to deflect the combustible air-fuel mixture in a generally radial direction toward the outer wall of said primary combustion chamber thereby establishing a recirculating flow pattern in the interior of said combustion chamber, said center body having formed therein a central air flow passage, means for directing auxiliary air to said center body air flow passage thereby cooling the surfaces of said center body that are exposed to combustion gases, and means for circulating said center body air flow through said nozzle thereby assisting in atomization of the liquid fuel admitted to said prechamber through said nozzles.

7. An internally vaporizing combustor for use in generating high velocity fuel combustion exhaust gases comprising a combustor prechamber and a primary combustion chamber, said prechamber and combustion chamber being in communication through an opening, one with respect to the other, the prechamber being upstream from the combustion chamber, said combustor being adapted to be disposed on the discharge side of an air compressor whereby prechamber air flow is admitted to an entrance zone of said prechamber, a liquid fuel nozzle means located in said prechamber for establishing an atomized liquid fuel flow for supporting combustion, a dilution zone located on the downstream side of said primary combustion chamber, dilution zone air flow ports in said combustor housing for establishing a flow path between the flow outlet side of said air compressor and the interior of said dilution zone, means for controlling the rate of air flow through said prechamber and for establishing a recirculating flow pattern of the air-fuel mixture contents of said prechamber port entering said combustion chamber whereby combustion in said combustion chamber is stabilized, the evaporator time of the liquid fuel in said prechamber being less than the residence time in said prechamber and the auto ignition time of the air-fuel mixture entering said primary combustion chamber being greater than the prechamber residence time for any given operating temperature of the air-fuel mixture, said prechamber and said primary combustion chamber being defined in part by separate portions arranged in coaxially spaced disposition, one with respect to the other, whereby high temperature combustion gases in said primary combustion chamber are isolated from the air-fuel mixture in said prechamber and means for varying the size of said opening and for controlling the dilution air flow in predetermined relationship to the control of air flow through said prechamber whereby the pressure drop across the combustor is substantially uniform.

8. An internally vaporizing combustor for use in generating high velocity fuel combustion exhaust gases comprising a combustor prechamber and a primary combustion chamber, said prechamber and combustion chamber being in communication through an opening, one with respect to the other, the prechamber being upstream from the combustion chamber, said combustor being adapted to be disposed on the discharge side of an air compressor whereby prechamber air flow is admitted to an entrance zone of said prechamber, a liquid fuel nozzle means located in said prechamber for establishing an atomized liquid fuel flow for supporting combustion, a dilution zone located on the downstream side of said primary combustion chamber, dilution zone air flow ports in said combustor housing for establishing a flow path between the flow outlet side of said air compressor and the interior of said dilution zone, means for varying the size of said opening and thereby controlling the rate of air flow through said prechamber and for establishing a recirculating flow pattern of the air-fuel mixture contents of said prechamber port entering said combustion chamber whereby combustion in said combustion chamber is stabilized, the evaporator time of the liquid fuel in said prechamber being less than the residence time in said prechamber and the auto ignition time of the air-fuel mixture entering said primary combustion chamber being greater than the prechamber residence time for any given operating temperature of the air-fuel mixture, valve means for varying the effective flow area of said dilution zone air intake openings, and means for varying the degree of communication between said prechamber and said primary combustion chamber, said last-named means being adapted to operate in unison with the aforesaid valve means whereby an increase in the degree of communication between said prechamber and said primary combustion chamber is accompanied by a corresponding decrease in effective flow area of said dilution zone air flow openings whereby the effective combustor pressure drop for the gases passing through the combustor may be controlled at a relatively constant value throughout the operating range of the combustor, said prechamber and said primary combustion chamber being defined in part by separate portions arranged in coaxially spaced disposition, one with respect to the other, whereby high temperature combustion gases in said primary combustion chamber are isolated from the air-fuel mixture in said prechamber.

9. The combination as set forth in claim 2 wherein said means for controlling the degree of communication between the prechamber outlet and the primary combustion chamber inlet is a center body adapted to register with the exit opening of said prechamber, said center body comprising a wall movable toward and away from the margin of the opening between the prechamber and the combustion chamber thereby providing a variable annular area through which the prechamber exit flow is controlled, an increase in the effective annular area being accompanied by a corresponding decrease in the effective flow area for said dilution zone air flow ports, said prechamber and said primary combustion chamber being defined in part by separate portions arranged in coaxially spaced disposition, one with respect to the other, whereby high temperature combustion gases in said primary combustion chamber are isolated from the air-fuel mixture in said prechamber.

10. The combination as set forth in claim 3 wherein said center body comprises a stem extending generally axially with respect to the axis of said prechamber, the end of said center body adjacent said primary combustion zone being adapted to deflect the combustible air-fuel mixture in a generally radial direction toward the outer wall of said primary combustion chamber thereby establishing a recirculating flow pattern in the interior of said combustion chamber, said prechamber and said primary combustion chamber being defined in part by separate portions arranged in coaxially spaced disposition, one with respect to the other, whereby high temperature combustion gases in said primary combustion chamber are isolated from the air-fuel mixture in said prechamber.

11. The combination as set forth in claim 2 wherein said means for controlling the degree of communication between the prechamber outlet and the primary combustion chamber inlet is a center body adapted to register with the exit opening of said prechamber, said center body comprising a wall movable toward and away from the margin of the opening between the prechamber and the combustion chamber thereby providing a variable annular area through which the prechamber exit flow is controlled, an increase in the effective annular area being accompanied by a corresponding decrease in the effective flow area for said dilution zone air flow ports, said center body having formed therein a central air flow passage, means for directing auxiliary air to said center body air flow passage thereby cooling the surfaces of said center body that are exposed to combustion gases, and means for circulating said center body air flow through said nozzle thereby assisting in atomization of the liquid fuel admitted to said prechamber through said nozzles, said prechamber and said primary combustion chamber being defined in part by separate portions arranged in coaxially spaced disposition, one with respect to the other, whereby high temperature combustion gases in said primary combustion chamber are isolated from the air-fuel mixture in said prechamber.

12. The combination as set forth in claim 3 wherein said center body comprises a stem extending generally axially with respect to the axis of said prechamber, the end of said center body adjacent said primary combustion zone being adapted to deflect the combustible air-fuel mixture in a generally radial direction toward the outer wall of said primary combustion chamber thereby establishing a recirculating flow pattern in the interior of said combustion chamber, said center body having formed therein a central air flow passage, means for directing auxiliary air to said center body air flow passage thereby cooling the surfaces of said center body that are exposed to combustion gases, and means for circulating said center body air flow through said nozzle thereby assisting in atomization of the liquid fuel admitted to said prechamber through said nozzles, said prechamber and said primary combustion chamber being defined in part by separate portions arranged in coaxially spaced disposition, one with respect to the other, whereby high temperature combustion gases in said primary combustion chamber are isolated from the air-fuel mixture in said prechamber.

13. An internally vaporizing combustor for use in generating high velocity fuel combustion exhaust gases comprising a combustor prechamber and a primary combustion chamber, said prechamber and combustion chamber being in communication through an opening, one with respect to the other, the prechamber being upstream from the combustion chamber, said combustor being adapted to be disposed on the discharge side of an air compressor whereby prechamber air flow is admitted to an entrance zone of said prechamber, a liquid fuel nozzle means located in said prechamber for establishing an atomized liquid fuel flow for supporting combustion, a dilution zone located on the downstream side of said primary combustion chamber, dilution zone air flow ports in said combustor housing for establishing a flow path between the flow outlet side of said air compressor and the interior of said dilution zone, means for varying the size of said opening thereby controlling the rate of air flow through said prechamber and for establishing a recirculating flow pattern of the air-fuel mixture contents of said prechamber port entering said combustion chamber whereby combustion in said combustion chamber is stabilized, the evaporator time of the liquid fuel in said prechamber being less than the residence time in said prechamber and the auto ignition time of the air-fuel mixture entering said primary combustion chamber being greater than the prechamber residence time for any given operating temperature of the air-fuel mixture, means for thermally isolating said prechamber airflow from said primary combustion chamber and means for varying the degree of communication between said prechamber and said primary combustion chamber whereby the combustion flame in the primary combustion chamber is stabilized and the effective combustor pressure drop for the gas passing through the combustor may be controlled within predetermined design limits throughout the entire operating range of the combustor.

14. The combination as set forth in claim 13, wherein said means for controlling the degree of communication between said prechamber and said primary combustion chamber is a center body in registry with the exit opening of said prechamber, said center body comprising a wall moveable toward and away from the margin of the opening between said prechamber and said primary combustion chamber thereby providing a variable annular area through which the prechamber exit flow is controlled.

15. The combination as set forth in claim 13, wherein the means for thermally isolating the primary combustion chamber from the prechamber gas flow includes a high temperature resistant liner for the interior of the primary combustion chamber whereby the temperature of the liner wall in the primary combustion chamber approaches the combustion temperatures thereby avoiding flame quenching during combustion.

* * * * *